US007602994B2

(12) United States Patent
Tellenbach et al.

(10) Patent No.: US 7,602,994 B2
(45) Date of Patent: Oct. 13, 2009

(54) ADVERTISING

(75) Inventors: Markus Tellenbach, Herrliberg (CH); Walter Huegli, Zürich (CH)

(73) Assignee: HOEG. LI Ltd., Zurich (CH)

( * ) Notice: Subject to any disclaimer, the term of this patent is extended or adjusted under 35 U.S.C. 154(b) by 1335 days.

(21) Appl. No.: 10/380,455

(22) PCT Filed: Aug. 9, 2001

(86) PCT No.: PCT/CH01/00490

§ 371 (c)(1),
(2), (4) Date: Jul. 25, 2003

(87) PCT Pub. No.: WO02/23516

PCT Pub. Date: Mar. 21, 2002

(65) Prior Publication Data

US 2004/0100088 A1 May 27, 2004

(30) Foreign Application Priority Data

Sep. 11, 2000 (CH) .................................... 1769/00

(51) Int. Cl.
*G06K 9/36* (2006.01)

(52) U.S. Cl. ....................... 382/284; 382/282; 382/294; 358/540; 358/450

(58) Field of Classification Search ................. 382/282, 382/284, 291, 294; 358/450, 452, 453
See application file for complete search history.

(56) References Cited

U.S. PATENT DOCUMENTS 5,867,170 A * 2/1999 Peterson ..................... 345/592
6,125,374 A * 9/2000 Terry et al. ................. 715/234
6,334,109 B1 * 12/2001 Kanevsky et al. ............. 705/14
6,381,001 B1 * 4/2002 Katakura et al. .............. 355/30
6,487,538 B1 * 11/2002 Gupta et al. .................. 705/14
6,557,017 B1 * 4/2003 Venable ...................... 715/210
6,654,506 B1 * 11/2003 Luo et al. .................... 382/282
6,655,284 B1 * 12/2003 Hoshii et al. ................ 101/484
6,738,090 B2 * 5/2004 No et al. ................ 348/207.11
6,771,290 B1 * 8/2004 Hoyle ......................... 715/745
6,882,348 B2 * 4/2005 Hirono ........................ 345/619
6,940,526 B2 * 9/2005 Noda et al. ................. 345/629
7,010,176 B2 * 3/2006 Kusunoki ................... 382/299
7,064,857 B2 * 6/2006 Parker et al. ............... 358/1.18
7,209,149 B2 * 4/2007 Jogo .......................... 345/622

* cited by examiner

*Primary Examiner*—Yosef Kassa
(74) *Attorney, Agent, or Firm*—Janet Sleath; Speckman Law Group PLLC

(57) ABSTRACT

The invention relates to a method for producing advertising, comprising the following steps: in a first step, individual image information that is stored on a storage medium is prepared for image processing; during a subsequent image processing step, the individual information is at least partially replaced by advertising information that is not part of the image; in the next step, the remaining individually recorded image information and the advertising information that is not part of the image is transferred to a positive material. The invention also relates to the advertising produced according to this method, which comprises individually recorded image information and advertising information that is not part of the image. The advertising information partially or wholly overlaps the individually recorded image information in determinable areas.

15 Claims, 3 Drawing Sheets

ADVERTISING

FIELD OF THE INVENTION

Figure 1:
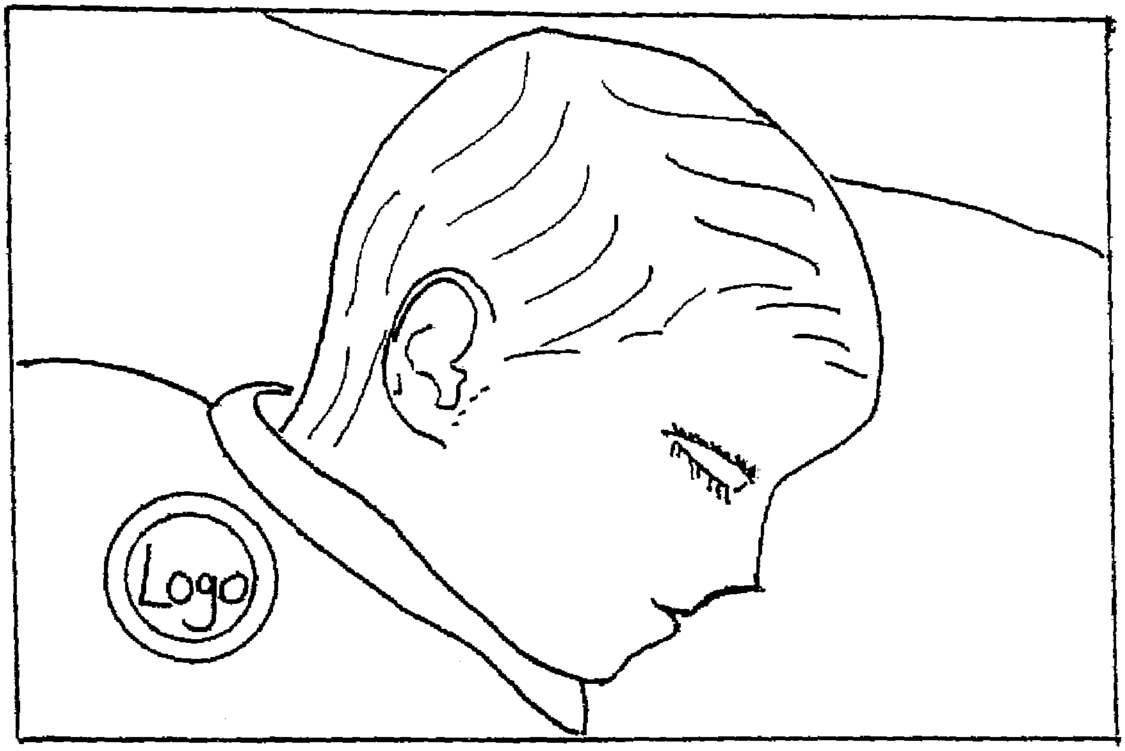

The present invention relates to a method for producing advertising.

BACKGROUND OF THE INVENTION

In spite of increasing budgets for advertising, it is becoming more and more difficult for the advertising branch to get their message across to the man or to the potential customer, visitor or voters. On the one hand, the stimulus threshold of the target persons for the advertising message increases, wherein at the same time the attention span decreases ever further. On the other handy the persons to be influenced are less and less prepared to receive advertising messages at all. This expresses itself in the various fields:

with advertising intervals in television the viewer continuously switches over;

advertisement in newspapers are turned over within a fraction of seconds;

an increasing number of households rely on so-called “Robinson lists” and desire no advertising material in their letterboxes; and on surfing on the Internet advertising windows may be filtered out by way of free software which may be installed very easily.

The oldest field of advertising which still has the most turnover is with publishing and print media. Apart from advertisements and pieces in newspapers and magazines, in recent years one has placed great emphasis on leaflets and flyers. Even if such hand slips are designed with great effort and distributed personally, within a few moments they mostly end up unread on the street or in the next waste bin. Very high circulations are required in order to ensure that at least a small circle of persons takes note of the goods or event which is advertised. A very impressive example for the low efficiency of this advertising are the masses of paper waste which covers the streets and squares at sports and music events.

SUMMARY OF THE INVENTION

The applicant has very successfully established advertising in the form of free postcards in the market. With this, postcards with an advertising print on the front side are offered in postcard stands for free at locally accessible public places which are frequently visited. The sender of the postcard selects a subject according to his taste from this and may subsequently send this by normal post to the receiving person. The advertising information on each card is thus taken notice of by at least two persons. Furthermore, this advertising is extremely efficient and profitable since the largest share of the cards end up at the user and are not thrown away unread. One therefore reaches a considerably larger circle of persons with a considerably smaller number of advertising means than with usual anonymous hand slips or leaflets distributed randomly. The sender and receiver however mostly are interested in the rear side of the card which has the personal text message than in the front side with the advertising information. Although at each location one offers a plurality of advertising themes, it may however occur again and again that a passer-by does not find any of the subjects interesting enough to take a card and send it.

The advertising and marketing industry suffers from the fact that with known advertising one may not ensure to the desired extent that the advertising information reaches as large as possible target public and that this public confronts the advertising information as often, as long and as intensively as possible.

It is the object of the present invention to provide a method for producing advertising and to make available new advertising means, which does not have the above-mentioned disadvantages.

This object is achieved by a method for producing such advertising according to the characterising features of claim 1, and individualised advertising means according to the characterising features of claim 17.

Further embodiment variants are to be deduced from the dependent claims.

BRIEF DESCRIPTIONS OF THE DRAWINGS

Figure 2:
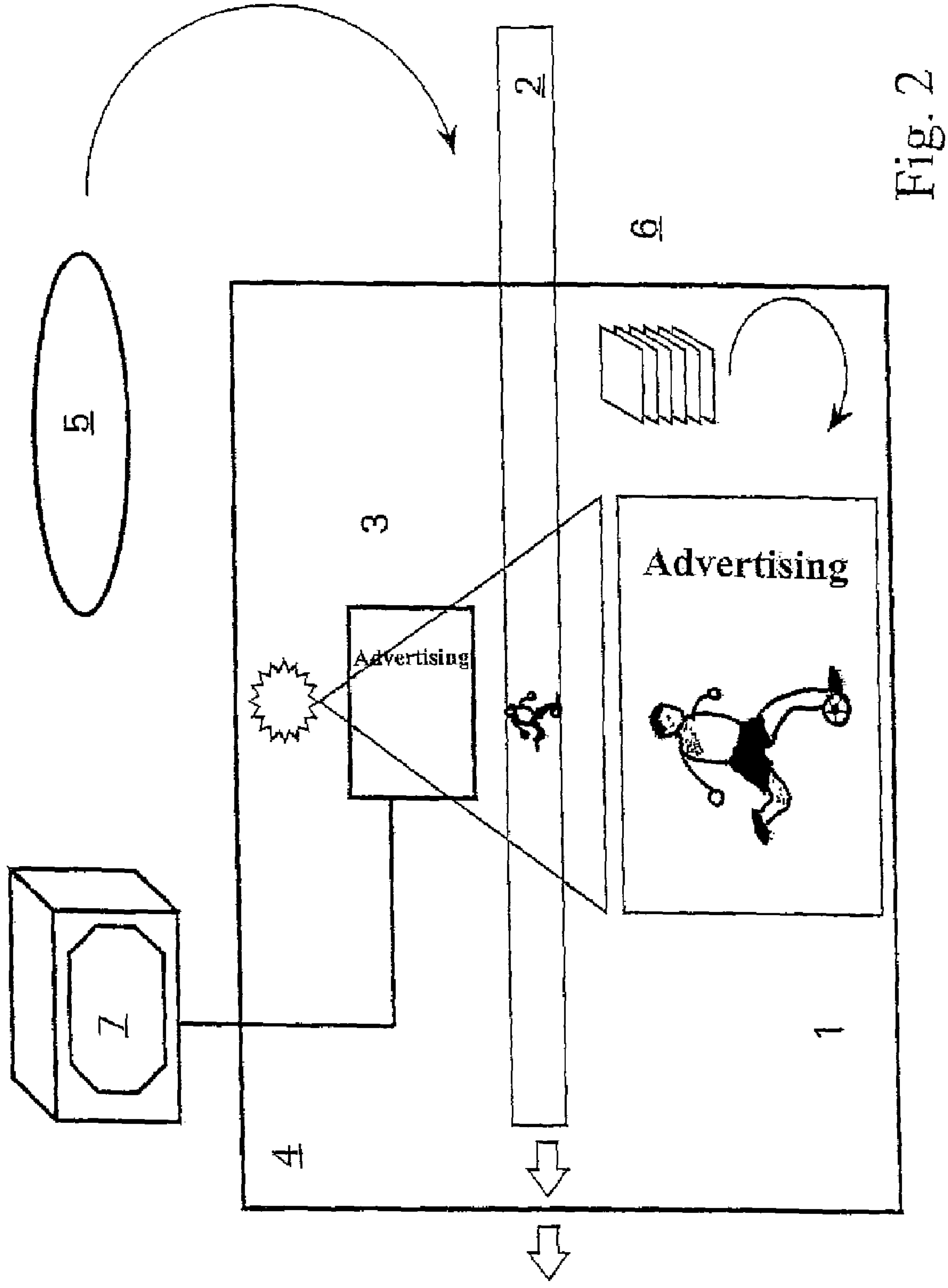
Figure 3:
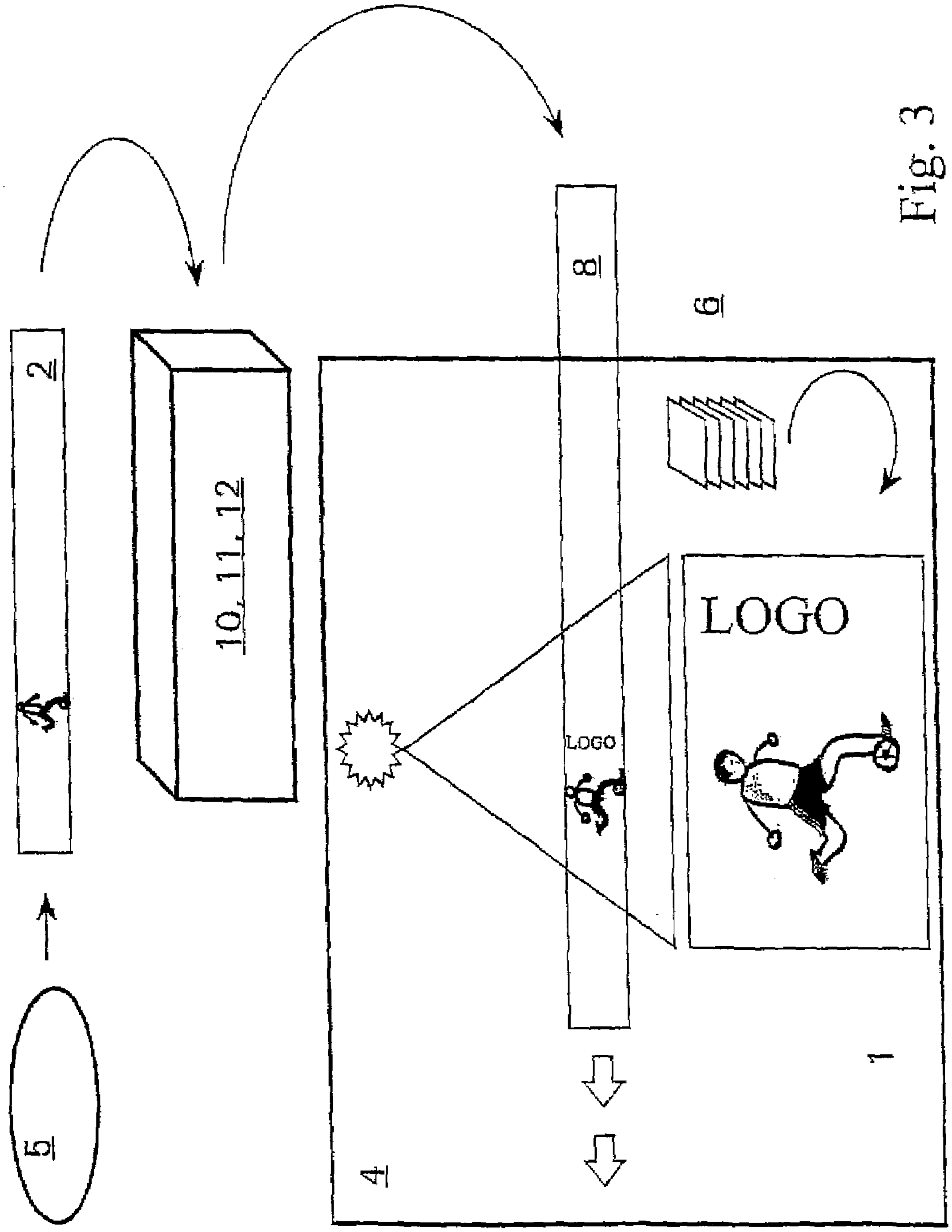

In the drawings there are shown embodiment examples of the subject matter of the invention and these are explained in the subsequent description. There are shown in:

FIG. 1: an individualised advertisement means;

FIG. 2 a schematic drawing of the procedure of a manufacturing method according to one embodiment form of the present invention; and FIG. 3 a schematic drawing of a further manufacturing method according to a further embodiment form of the present invention

DETAILED DESCRIPTION OF THE INVENTION

The present invention uses the knowledge of the fact that an individualization of an advertisement means leads to an increased interest of the addressee in the advertising information contained in the advertisement. The target public of the new advertising are on the one hand photo amateurs and all observers of the pictures which were taken by these. By way of the method according to the invention, one produces advertising means with which the advertising information and individually recorded picture information are combined with one another in one picture. Since an observer has a great interest in the individually recorded picture information, the advertising information visible at the same time also experiences an increased attention.

As an incentive for photo amateurs to have advertising according to the invention produced, as is for example shown in FIG. 1 with the logo of the applicant, one may apply price reductions or free offers for the developing and print costs. Since a photo amateur is highly unlikely to voluntarily accept an advertising logo or another advertising message clearly visible on his pictures, the operating advertiser offers to fully or partly assume the costs for development and/or printing, and for this he may place his advertising information in the pictures. The price reduction may for example be graded depending on the share of area which the advertising information assumes.

In the following, by way of a few examples, the nature of the production method according to the invention is explained.

Example 1

Conventional Photography, Conventional Development and Conventional Exposure of the Positive Material The photo amateur exposes, in the usual manner according to his taste, individually selected picture motives on a colour or black/white negative film, for example in small-picture or APS format. He sends the negative film directly to the picture developer or drops it off at a photo store or another acceptance location for further dispatch to the picture developer. As is sketched in FIG. 2, at the picture developer by way of a known developing process 5 the negative film 2 is developed, fixed and dried. Subsequently one exposes the photographic positive material 6 through the negative 2 carrying the individual picture information. With the exposure directly above or below the negative there is located a mask 3 with the desired advertising information so that on the photographic positive material 6, advertising information foreign to the picture is imaged additionally to the individual picture information. This mask 3 according to a preferred embodiment form of the invention is a highly transparent LCD mask which may be co-activated by an external control unit 7, for example by the control computer of the developing automatic machine 4 and the advertising information foreign to the picture is displayed during the exposure procedure. The position, size, intensity and manner of the advertising information displaced on the LCD mask 3 may be selected by the picture processor and be fixed in a controlled manner by suitable software.

In a further embodiment form of the method according to the invention the photographic positive material is not exposed simultaneously with the individual picture information and the advertising information foreign to the picture but in a temporally and spatially staggered manner. Preferably with this two-step exposure in first step the photographic positive material is exposed through the negative carrying the individual picture information, wherein the regions of the photographic positive material which is to carry the advertising information foreign to the picture should be shielded from impinging light by way of a mask. In the subsequent second step the advertising information may be exposed by a second mask or a second negative carrying the advertising information onto the regions of the positive material which are still not exposed. One may thus avoid partial double exposure which increases the quality of the advertising.

Whilst the advertising information is unchangeably integrated in the positive pictures or prints, the negative film remains unchanged and is send together with the prints to the amateur photographer or he may himself collect these in the photo store. The fact that the negative film exclusively contains the individual picture information exactly as the photo amateur has exposed, should lead to an acceptance of the method according to the invention. If the photo amateur or consumer desired prints without advertising information from one or more pictures, then with the help of the unchanged negatives he may get these done at any time by a photo developer or a photo laboratory.

Example 2

Conventional Photography, Conventional Developing and Manufacture of a First Negative Medium, Digital Intermediate Processing, Manufacture of a Second Negative Film and Conventional Exposure of the Positive Material In this example the application of hybrid technology with the method according to the invention is to be explained.

The photo amateur exposes in the usual manner according to his taste individually selected picture motives on a colour or black/white negative film, for example in small-picture or APS format. He sends the negative film directly to the picture developer or drops it off at a photo store or another acceptance location for further dispatch to the picture developer. As is sketched in FIG. 2, at the picture developer by way of a known developing process 5 the negative film 2 is developed, fixed and dried. Subsequently the analog original picture, thus the negative film 2 is digitised with a scanner 10. The individual digital picture data is stored on a host computer 11 in an individually characterised file until the further processing. Subsequently the file to be processed is opened and the advertising information is combined with the individual picture information by way of a suitable software program. At the same time one or more defined regions of the individual picture may be completely covered with the advertising information so that each picture point or pixel of this certain region now only codes or stores advertising information and the original individual information is deleted at this picture point.

The advertising information which is to be added may also, in more or less transparent form, for example as a digital watermark, be combined with the individual picture information. In this case part regions of the individual picture are not completely covered with the advertising information, but only modified. Each picture point or pixel of this defined region which carries advertising information is modified in colour and/or brightness such that for the observer one may now only recognise the original individual information in modified form, but at the same time the advertising information is visibly superimposed in these regions. The advertising information is likewise stored on the host computer 11 and may be called up from the host computer from an external memory unit. If a plurality of advertising information files are stored and may be called up, then the advertising information may be varied from picture to picture. With a picture sequence of 24 individually recorded pictures one may for example integrate a new advertising motive per picture. The selection, positioning and the size of the region containing the advertising information may likewise be selected by the processor of the picture and be fixed in a controlled manner by suitable software.

The file created in this manner which contains the desired picture or picture series is again intermediately stored and subsequently by way of a shooting unit 12 one exposes on photographic negative material. This again is developed, fixed and dried. Subsequently in the known manner one exposes the photographic positive material 6 through such a negative carrying the individual picture information and the integrated advertising information.

Whilst the advertising information is unchangeably integrated in the advertising means 1, the original negative film 2 remains unchanged and as in the method according to Example 1 is sent to the amateur photographer together with the advertising means, or may be collected from the photo store by him.

Example 3

Digital Photography and Digital Exposure of the Positive Material

The photo amateur according to his taste records individually selected picture motives with a digital camera and stores them in a suitable storage medium. Since digital photography is still quite young and the hardware manufacturers have neither agreed on a standard storage medium nor on a standardised file format, one presently considers the most varied of file formats (TIFF, JPEG, JPEG2000, BMP, PCX, WMF etc) and various known storage media. Presently magnet memories such as floppy disc, zip discs and jazz discs and RAM memories such as flash memory, PC cards and memory sticks are applied in digital cameras. Miniaturised hard disk drives are just about to be brought onto market. Optical or magnet/optical media such as CDs, DVDs and MOs are considered. In place of a digital photo camera one may of course also photograph with a digital video camera, or individual picture information may be stored on magnetic tape or on videocassette. The storage medium or the data carrier is sent by the digital photographer directly to the picture developer or he takes it to a photo shop or another acceptance location for transmitting further to the developer. The picture information may also be transmitted without giving storage medium to the picture developer. Thus the photographer may for example download the individual picture data from the storage medium onto a terminal or an order station of the picture developer. He may observe the picture in their raw versions by way of a monitor at the terminal. Then individual shots are selected and the prints are ordered in the desired format, cut and finish.

The file with the individual picture information, at the picture developer, is stored on a host computer until further processing. The file to be processed is opened and by way of a suitable software program and the advertising information is combined with the individual picture information. At the same time one or more defined regions of the individual picture may be completely covered with the advertising information so that each picture point or pixel of this defined region now only codes or stores advertising information and the original individual information at this picture point is deleted. The deletion of the information is not a problem, since indeed the digital photographer has stored the original file. If the original file is sent with the storage medium then this is left unchanged on the medium and is returned to the photographer. The advertising information to be added may also be combined with the individual picture information in more or less transparent form, for example as a digital watermark. In this case part regions of the individual picture are not fully covered with the advertising information, but only modified. Each picture point or pixel of this defined region which carries advertising information is modified in colour and/or brightness such that the observer may still recognise the original individual information in modified form, but at the same time the advertising information is visibly superimposed in these regions. The advertising information is likewise stored on the host computer or may be called up from the host computer from an external memory unit. If a plurality of advertising information filed are stored and may be called up, then the advertising information may be varied from picture to picture. With a picture series of 24 individually taken pictures one may for example integrate a new advertising motive. The selection, position and size of the region carrying the advertising information may likewise be selected by the picture processor and be fixed in a manner controlled by suitable software.

Subsequently for example one exposes on photo-emulsion. Thus additionally to the individual picture information the advertising information foreign to the picture is additionally imaged on the photographic positive material. Such positive pictures or prints are de facto similar in life expectancy and price to conventional prints. The picture quality on account of the lower resolution of the digital cameras which are used today are inferior to small-picture or APS films, but this will rapidly change with the introduction onto the market of digital cameras with greater performance. The picture quality which is achieved may at least be accepted with regard to the desired quality by amateur photographers. The finished advertising means are sent to the amateur photographer or these may be collected from the photo store or an order station.

If the photo amateur or consumer desires one or more prints without advertising information, then with the help of the original file or a copy thereof he may produce advertising-free prints at the picture developer at any time.

Example 4

Conventional Photography Conventional Developing and Digital Exposure of the Positive Material As has already been described in example 2 the photo amateur in the usual manner according to his taste exposes individually selected picture motives on a colour or black/white negative film. He sends the negative film directly to the picture developer or gives it to a photo store or another place of deposit for further dispatch to the picture developer. At the picture developer, by way of known developing processes the negative film is developed, fixed and dried. Subsequently the analog picture original is digitised according to the hybrid technology which likewise has already been mentioned. The individual digital picture data is stored on a host computer until its further processing in an individually characterised file. Subsequently the file to be processed is opened and by way of a suitable software program the advertising information is combined with the individual picture information, as already described in the Examples 2 and 3 As will be explained in yet more detail in the following examples, subsequently the thus created file which contains the desired picture with individual picture information and integrated advertising information is again intermediately stored and subsequently is printed on a suitable positive material or digitally exposed on a suitable positive material.

Example 5

Digital Photography and Digital Print Out of the Print

Analogously to the method according to Example 3 individually selected picture motives are recorded and stored by the photo amateur according to his taste. The storage medium is again sent to the picture developer, or deposited at a photo store or another place of acceptance or is stored on a previously described terminal or order station of the picture developer. At the terminal the shots may be observed in their raw version, individual shots may be selected and the order of the prints with desired format picture, cut and finish may be made. At the picture developers the file with the individual picture information is stored and processed further on a host computer. The file to be processed is opened and by way of a suitable software program the advertising information is combined with the individual picture information as already described under Example 3. The thus created file, which contains the desired picture with individual picture information and integrated advertising information, is a gain intermediately stored and subsequently printed. The print is preferably effected on suitable positive material by way of an ink-jet printer, thermo sublimation printer or a colour laser printer.

The finished advertising are sent to the amateur photographer or they may be collected by him at the photo store or at the location of the terminal.

Example 6

Digital Photography and Digital Print Out

The following embodiment variant differs from the embodiment of the method which was described in Example 5 in that a hardware-modified and/or software modified digital printer is applied for home use. The printer may be connected to a home computer via an interface or directly be connected to a digital camera. It is also possible to directly introduce the storage medium, for example a mini-HDD or a memory stick directly into a suitable accommodation device on the computer. The file with the individual picture information is opened and by way of suitable software program the advertising information is combined with the individual picture information as already described under example 3. The thus created file, which contains the desired picture with individual picture information and integrated advertising information is subsequently printed out. The printer is modified with regard to hardware and/or software in a manner such that it is ensured that with each print-out the advertising information is integrated in the picture. The attractiveness of this manufacturing method at the consumer may be increased with price reductions with the printer or consumption material.

Example 7

Digital Photography and Digital Print Out or Digital Exposure of the Print in an Automatic Machine Station With this embodiment form of the production method according to the invention all steps are carried out in an automatic machine station. The storage medium with the files which carries the individually removed and stored picture motives is introduced into a suitable drive or into a suitable introduction slot on the terminal or at the automatic machine station. The original file is stored and opened in the host computer of the terminal. At the monitor the shots may be observed in raw form, individual recordings selected and according to desire may be processed with various programs for improving the picture quality. The desired prints or printouts are inputted with the desired format, cut and finish. This additional information is stored together with the original picture information as a secondary picture file or a new control file is stored, which is linked with the file containing the original picture information. The secondary picture file or original and control file are subsequently opened and by way of a suitable software program the advertising information is combined with the individual picture information as has already been described under Example 3. The thus created file which contains the desired picture with individual picture information and integrated advertising information is again intermediately stored and subsequently is exposed onto positive material in the automatic machine as descried under Example 3, or is printed out as described under Example 5.

The issuing of the prints or printouts is effected directly at the automatic machine station so that the customer may take the finished advertising means with him after a short time.

The invention claimed is:

1. A method for producing advertising means, comprising:

preparing an individual photographic image stored on a storage medium for image processing;

at least partly replacing the individual photographic image with advertising information foreign to the image; and transferring the remaining individual photographic image and the advertising information foreign to the image to a positive material; wherein exposure of the photographic positive material through a negative material carrying the individual picture information and through the additional information carrier carrying the advertising information foreign to the picture is effected at the same time.

2. A method according to claim 1, wherein the individual photographic image is recorded with a digital camera and the method further comprises:

transferring a file containing the individual photographic image from a storage medium to a host computer;

at least partly replacing, using software, the individual photographic image with advertising information foreign to the photographic image; and storing the resulting picture comprising the combined advertising information and individual photographic image.

3. A method according to claim 2, wherein all method steps are carried out in an automatic machine station.

4. A method according to claim 2, wherein all method steps are carried out with a digital printer selected from the group consisting of: hardware-modified and software-modified digital printers for home use.

5. A method for producing advertising means, comprising:

transferring developed individual picture information stored on negative material to photographic positive material by exposing the negative material carrying the individual picture information;

exposing advertising information foreign to the picture stored on an additional information carrier; and producing at least one advertising print containing the individual picture information and advertising information foreign to the picture, wherein the advertising information is visibly integrated into the individual picture and at least partly replaces the individual picture information.

6. A method according to claim 5, wherein the exposure of the photographic positive material through the negative material carrying the individual picture information and through the additional information cater carrying the advertising information foreign to the picture are temporally and spatially effected separately from one another.

7. A method according to claim 6, comprising:

exposing the photographic positive material through the negative material carrying the individual picture information, wherein the regions of the photographic positive material which are to carry the advertising information foreign to the picture are shielded from incidence of light by a mask; and exposing the unexposed regions of the photographic positive material through the additional information carrier carrying the advertising information foreign to the picture.

8. A method according to claim 5, wherein the additional information carrier carrying the advertising information foreign to the picture is made of material selected from the group consisting of: analog negative film and digital, individually activatable LCD negative mask material.

9. A method for producing advertising means, comprising:

developing a negative material carrying individual picture information to provide a negative film;

digitalizing the negative film by hybrid technology to provide a digitalized negative file, wherein said digitalized negative file is intermediately stored on a host computer;

at least partly replacing, using software, the individually recorded picture information with advertising information foreign to the picture; and storing the resulting picture containing the combined advertising information and individual information to provide an intermediately stored combined picture; exposing the intermediately stored combined picture onto photographic negative material to be developed, fixed and dried; and exposing the photographic positive material through said photographic negative material carrying the combined picture.

10. A method according to claim 9 wherein at least one definable region of the individual picture is completely covered by the advertising information, whereby the defined region is only coded for advertising information and the original individual information in the picture region is deleted.

11. A method according to claim 9, further comprising:

combining the advertising information in a transparent form with the individual picture information; and modifying the color and brightness of regions of the original individual picture information that are covered with the advertising information, whereby in regions carrying the advertising information, the original individual picture information is recognizable to an observer.

12. A method according to claim 9, wherein a plurality of advertising information files are stored on the host computer.

13. A method according to claim 9, wherein the intermediately stored combined picture is exposed on photographic positive material.

14. A method according to claim 9, wherein the intermediately stored combined picture is printed on positive material.

15. A method according to claim 9, wherein a plurality of advertising information files are stored on an external storage unit and may be called up by the host computer.

* * * * *

UNITED STATES PATENT AND TRADEMARK OFFICE

CERTIFICATE OF CORRECTION

PATENT NO. : 7,602,994 B2
APPLICATION NO. : 10/380455
DATED : October 13, 2009
INVENTOR(S) : Mark Tellenbach and Walter Huegli It is certified that error appears in the above-identified patent and that said Letters Patent is hereby corrected as shown below:

| **Col. No.** | **Line(s)** | **Edits** |
|---|---|---|
| Title page | Item (73) | Please correct Assignee Name to: "Hueg.Li Ltd." |
| 8 | 34 | Within claim 6, after "the additional information," please change "cater" to "carrier" |

Signed and Sealed this

Twenty-second Day of December, 2009

David J. Kappos
*Director of the United States Patent and Trademark Office*

UNITED STATES PATENT AND TRADEMARK OFFICE

CERTIFICATE OF CORRECTION

PATENT NO. : 7,602,994 B2
APPLICATION NO. : 10/380455
DATED : October 13, 2009
INVENTOR(S) : Mark Tellenbach and Walter Huegli It is certified that error appears in the above-identified patent and that said Letters Patent is hereby corrected as shown below:

| Col. No. | Line(s) | Edits |
|---|---|---|
| Title page | Item (73) | Please correct Assignee Name to: “hueg.li Ltd.” |

Signed and Sealed this

Sixteenth Day of March, 2010

David J. Kappos
*Director of the United States Patent and Trademark Office*

UNITED STATES PATENT AND TRADEMARK OFFICE

CERTIFICATE OF CORRECTION

PATENT NO. : 7,602,994 B2
APPLICATION NO. : 10/380455
DATED : October 13, 2009
INVENTOR(S) : Tellenbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1844 days.

Signed and Sealed this

Fifth Day of October, 2010

David J. Kappos

*Director of the United States Patent and Trademark Office*